United States Patent [19]

Cabon et al.

[11] Patent Number: 5,258,762
[45] Date of Patent: Nov. 2, 1993

[54] IDENTIFICATION SYSTEM USING HERTZIAN WAVES, CONSISTING OF AN INTERROGATION STATION AND A RESPONDER UNIT

[76] Inventors: Philippe Cabon, 31450 9, rue Garoche, Pompertuzat; Jean-Francois Habigand, Route de Toulouse Pino, Balma, both of France

[21] Appl. No.: 598,662
[22] PCT Filed: Feb. 27, 1990
[86] PCT No.: PCT/FR90/00139
  § 371 Date: Oct. 28, 1991
  § 102(e) Date: Oct. 28, 1991
[87] PCT Pub. No.: WO90/10200
  PCT Pub. Date: Sep. 7, 1990

[30] Foreign Application Priority Data

Feb. 27, 1989 [FR] France ................................. 89 02502

[51] Int. Cl.⁵ ............................................ G01S 13/76
[52] U.S. Cl. ....................................... 342/42; 342/188
[58] Field of Search ..................... 342/42, 44, 51, 188

[56] References Cited

U.S. PATENT DOCUMENTS

| | | |
|---|---|---|
| 3,716,856 | 2/1973 | Beguin . |
| 3,945,006 | 3/1976 | Cleeton . |
| 4,679,046 | 7/1987 | Curtis et al. ........................ 342/51 |
| 4,799,059 | 1/1989 | Grindahl et al. ................. 340/870.3 |
| 5,021,790 | 6/1991 | Ohta et al. ............................ 342/44 |

FOREIGN PATENT DOCUMENTS 0186483 7/1986 European Pat. Off. .
0245606 3/1987 European Pat. Off. .
2048600 12/1980 United Kingdom .

Primary Examiner—T. H. Tubbesing
Attorney, Agent, or Firm—Fisher, Christen & Sabol

[57] ABSTRACT

Identification system constituted by an interrogation station or interrogator 1 itself formed by a radio frequency wave transceiver and preferably on an ultra frequency wave length 5, and, on the other hand, by a responder unit 2 adapted to receive the wave and to re-emit (echo) it following the given coded modulation to the responder unit. The interrogator is adapted to receive this echoing wave 11 and to demodulate it in order to derive the identification code therefrom. The interrogator has an emission antenna adapted to emit an inquiry signal constituted by a radio wave emitted in plane polarization. The responder unit has two adjacent antennas, respectively, for the reception of the inquiry wave and for its re-emission (echo) after modulation. The two antennas are of the circular polarization type and each functioning in a direction of rotation of the polarization opposite with respect to each other. This allows a differentiation between the emission inquiry signal and the response signal, since the inquiry signal wave is received by a circular polarization-type antenna of the responder unit according to a first rotation direction of the polarization. The responder unit is adapted to re-emit a modulated response signal constituted by a radio wave of the same kind as the inquiry wave of circular polarization-type according to a second rotation direction of the polarization in the opposite direction to the first rotation direction.

3 Claims, 13 Drawing Sheets

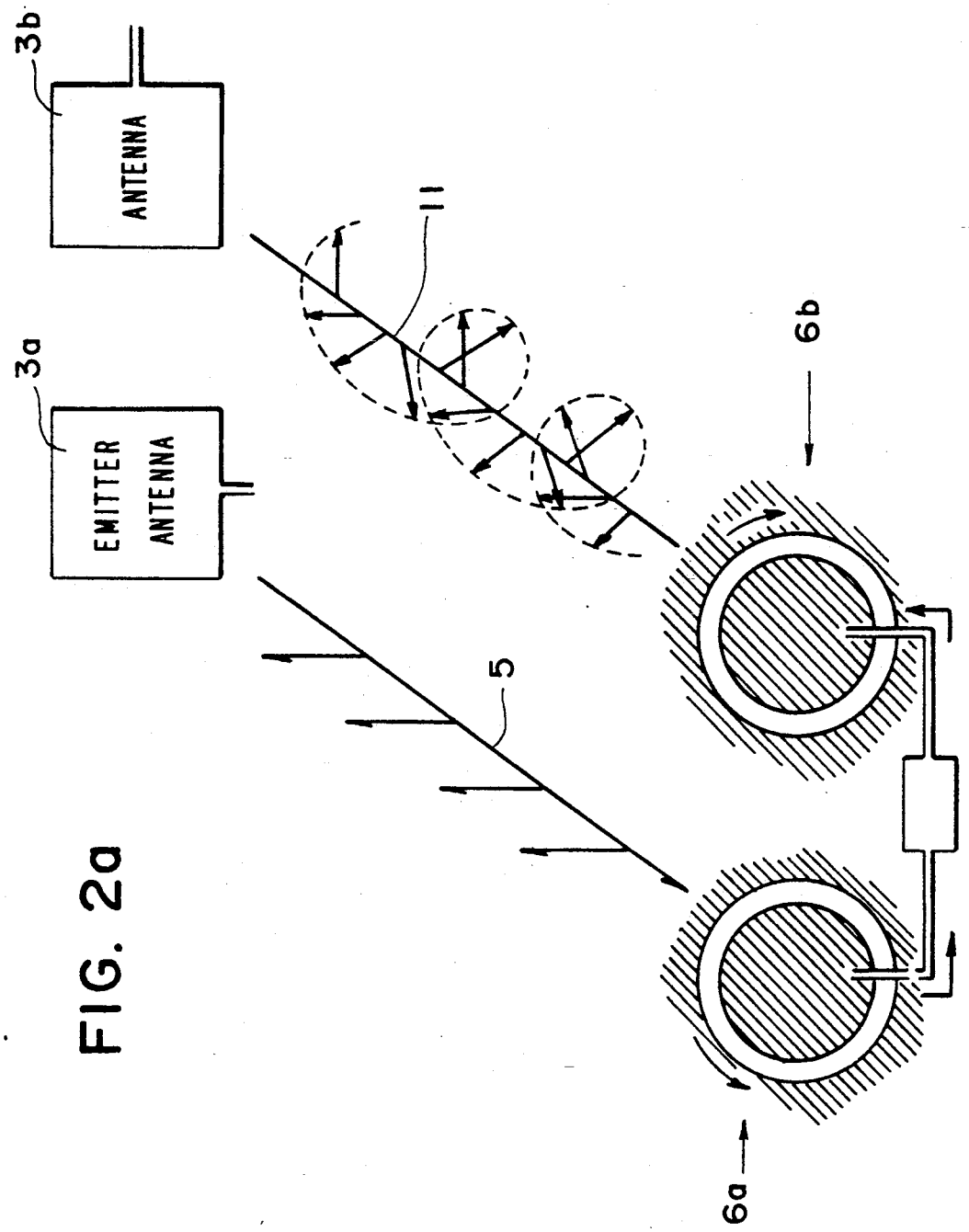

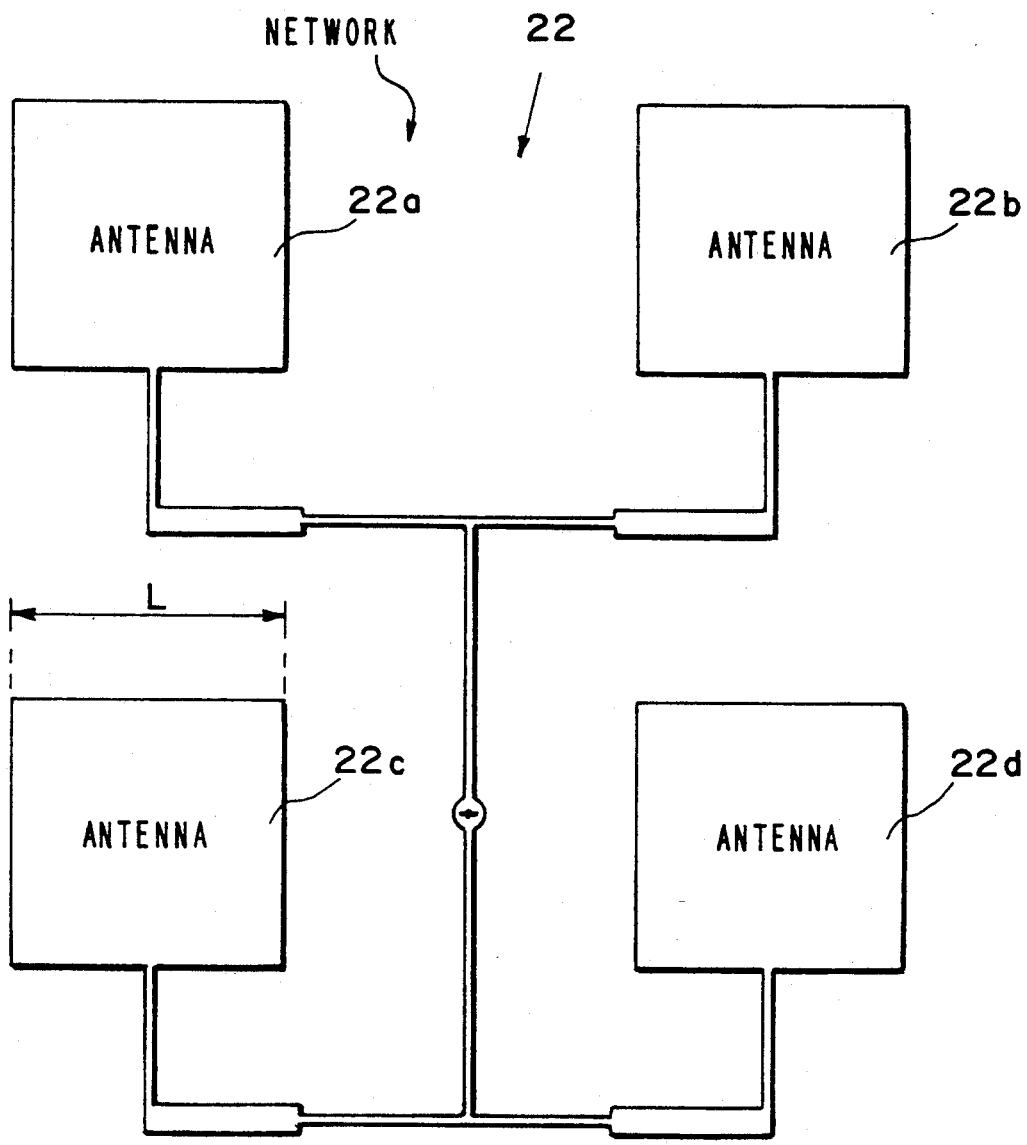

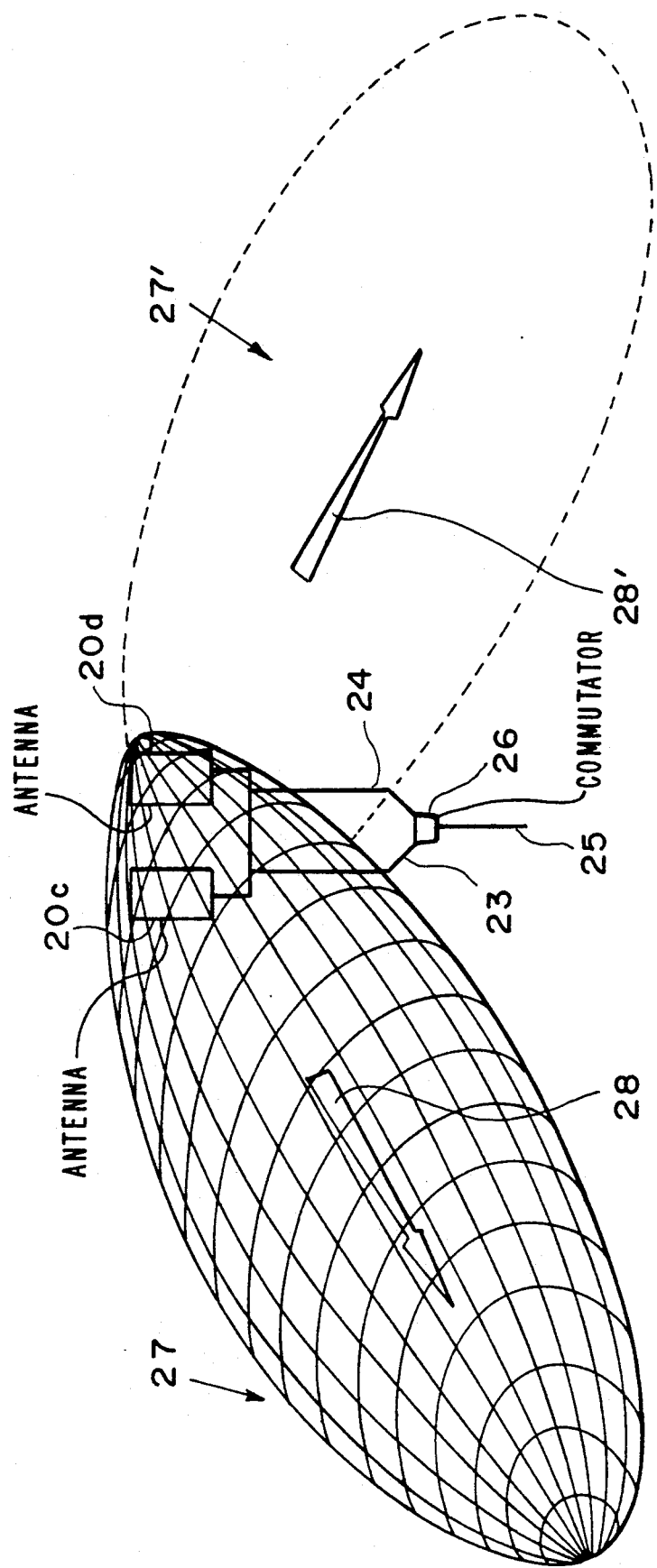

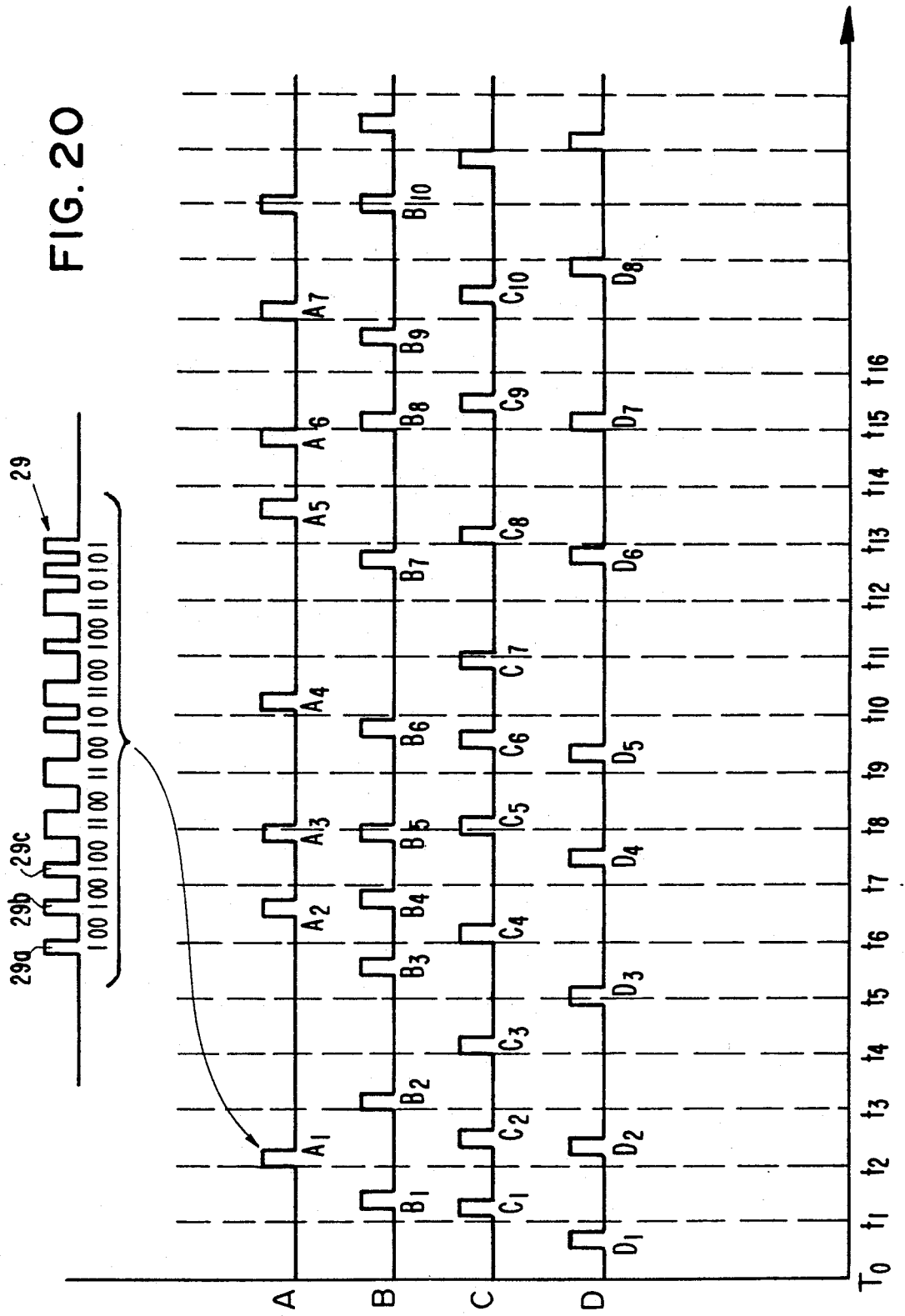

IDENTIFICATION SYSTEM USING HERTZIAN WAVES, CONSISTING OF AN INTERROGATION STATION AND A RESPONDER UNIT

BACKGROUND OF THE INVENTION

1. Field of the Invention

The present invention relates to a system of identification between at least one interrogation station or interrogator and at least one, and possibly a plurality of, response-stations or responder units.

And more particularly, the invention is applicable to the identification of a responder unit from an interrogation station; one of the two elements, either the responder unit or the interrogator, is mobile with respect to the other and identification is obtained without contact; transfer of the data being effected by radio waves.

2. Background Art

Numerous systems of this type which allow identification of a responder unit are known, and FIG. 1 illustrates the various functions performed within the framework of the presently known interrogation systems which are followed by an identification response.

According to FIG. 1, it is seen that an interrogation station 1 (fixed or mobile) emits a coded signal 5 on a radio wave length in particular and preferably on a submetric wave length.

More especially, UHF radio waves are used; the term "UHF wave" is used in the course of the present specification to designate radio frequency waves higher than 100 MHz.

To that end, the interrogation station or interrogator 1 comprises a wave generator or oscillator 4 which supplies the antenna 3 for the emission of the interrogation wave 5. This signal is picked up by the antenna 6 of a badge 2 which may transmit the signal to the detector 7 which alerts the control electronics 8, which triggers off, on the one hand, the memorizing of the signal picked up in the floating memory 9 as well as the supply of the modulator 10.

The signal is received by the badge 2 after modulation has taken place and is transmitted to antenna 3 which re-emits (echos) a response wave 11 of the same kind as the interrogation wave, but after modulation has taken place.

This wave is received in turn by antenna 3 of the fixed station and is processed by the mixer 12 with a view to extracting a low-frequency signal which corresponds to the modulation of the carrier wave; this low-frequency signal after amplification in 14 is processed in a microprocessor 13 in order, in particular, to analyze the signal and to determine the contents of the data.

This same device, limited to the interrogator, is illustrated by the diagram of FIG. 2.

BROAD DESCRIPTION OF THE INVENTION

This invention contributes improvements to and considerably develops the possibilities of use of the interrogation-response identification systems of the type specified.

A first object of the invention is to broaden the spectrum of the positionings of the responder unit in a state of receptivity with respect to the interrogator.

According to this development, the servitudes of the known devices which allow a good receptivity of the interrogation signal by the responder units only in privileged and relatively limited positionings of said responder unit, are eliminated.

A second object of the invention aims at broadening the practical possibilities of use of the identification system, particularly in the presence of a plurality of responder units capable of presenting themselves concomitantly at the interrogation station.

And it will thus be possible within the framework of the developments described hereinafter, to produce an interrogation system making it possible to detect, in discriminatory manner and separately, each of the responder units, although these latter present themselves substantially at the same time opposite the interrogator, avoiding response signals interfering between them.

To the end, the invention relates to an identification system of the type comprising, on the one hand, an interrogator constituted by a radio ultra high frequency wave transceiver. The interrogator comprises an interrogator emission antenna for emission of a permanent inquiry wave and an interrogator reception antenna. On the other hand, the invention includes a responder. The responder comprises a responder reception antenna for reception of the inquiry wave, a modulation transistor for coded modulation of the wave and a responder remission antenna for re-emission of the modulated wave as a response signal back to the interrogator. The interrogator emission antenna is of a topology of plane polarization type in a first plane of polarization, and the interrogator reception antenna is of a topology of plane polarization type in a second plate of polarization orthogonal with respect to the first plane. The responder reception antenna is of a topology of circular polarization type with a first direction of rotation of the polarization and the responder re-emission antenna is of circular polarization type with a second direction of the polarization opposite the first one.

Other characteristics and advantages of the invention will appear from the following description which is given in connection with some particular embodiments presented by way of non-limiting examples and with reference to the accompanying drawings.

FIG. 2a represents a skeleton which shows the polarizations of the inquiry and response waves.

Figure 4:
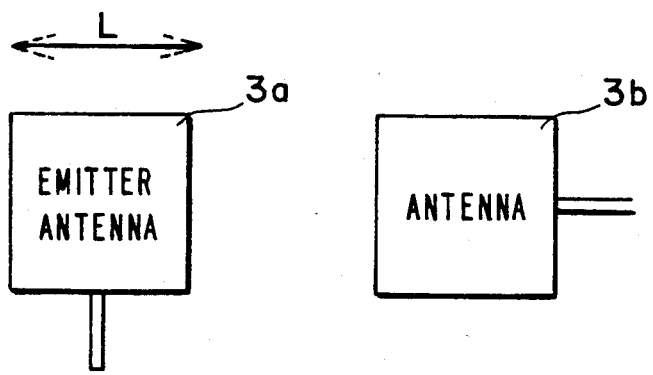

FIG. 4 gives two examples of antennas, respectively for emission (or interrogation) and reception (response) at the level of the interrogator.

Figure 5:
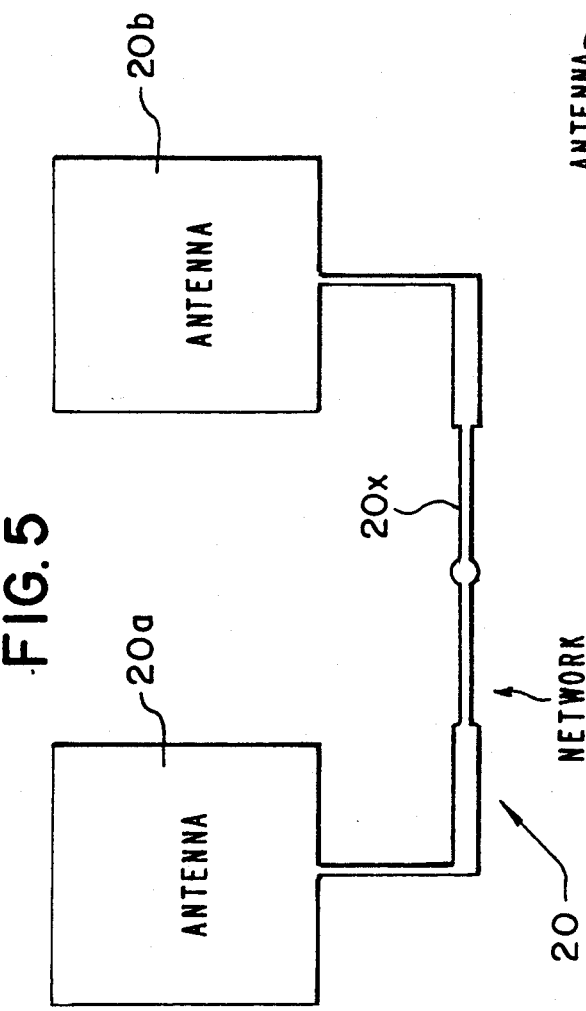

FIG. 5 represents a variant which shows a network of two emission antennas disposed on the interrogator.

Figure 6:
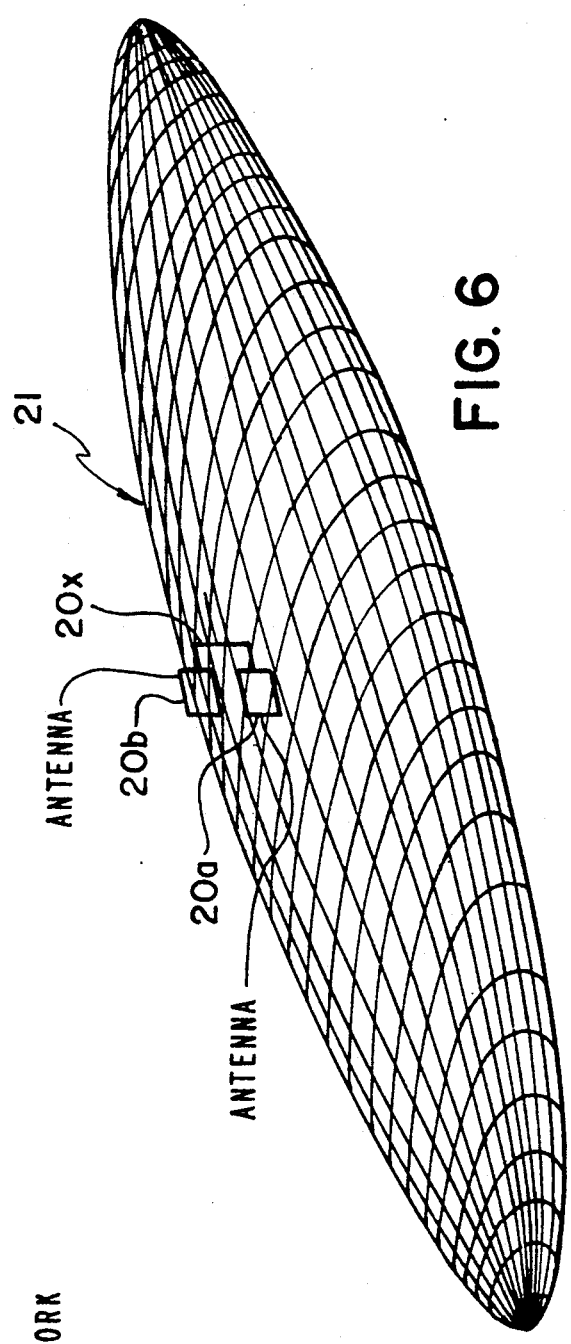

FIG. 6 shows a general form of the radiation lobe which is capable of being obtained by the network of the two emission antennas of FIG. 5.

FIG. 7 shows a network of four emission antennas which are capable of being used on an interrogator.

FIG. 8 shows a variant embodiment of emission antennas disposed on the interrogation station; the two twinned antennas are capable of being supplied in a differential manner by a commutator, the defining two different radiation lobes as a function of the conditions of supply.

Figure 9:
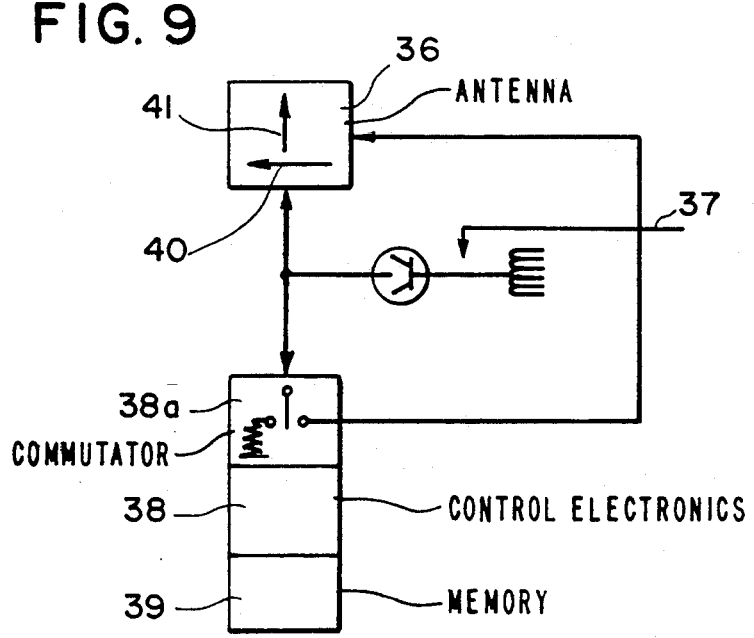

FIG. 9 shows a block diagram of the pulse modulation of the responder.

Figure 11:
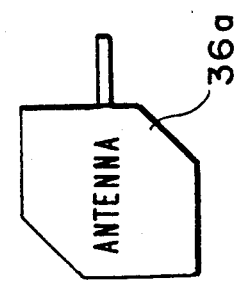
Figure 10:
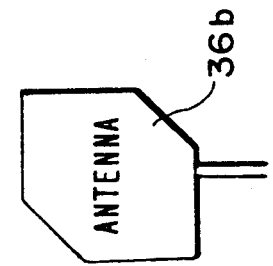

FIGS. 10 and 11 show two twinned antennas which are capable of being used within the framework of the re-emission of the response signal by the responder unit.

Figure 12:
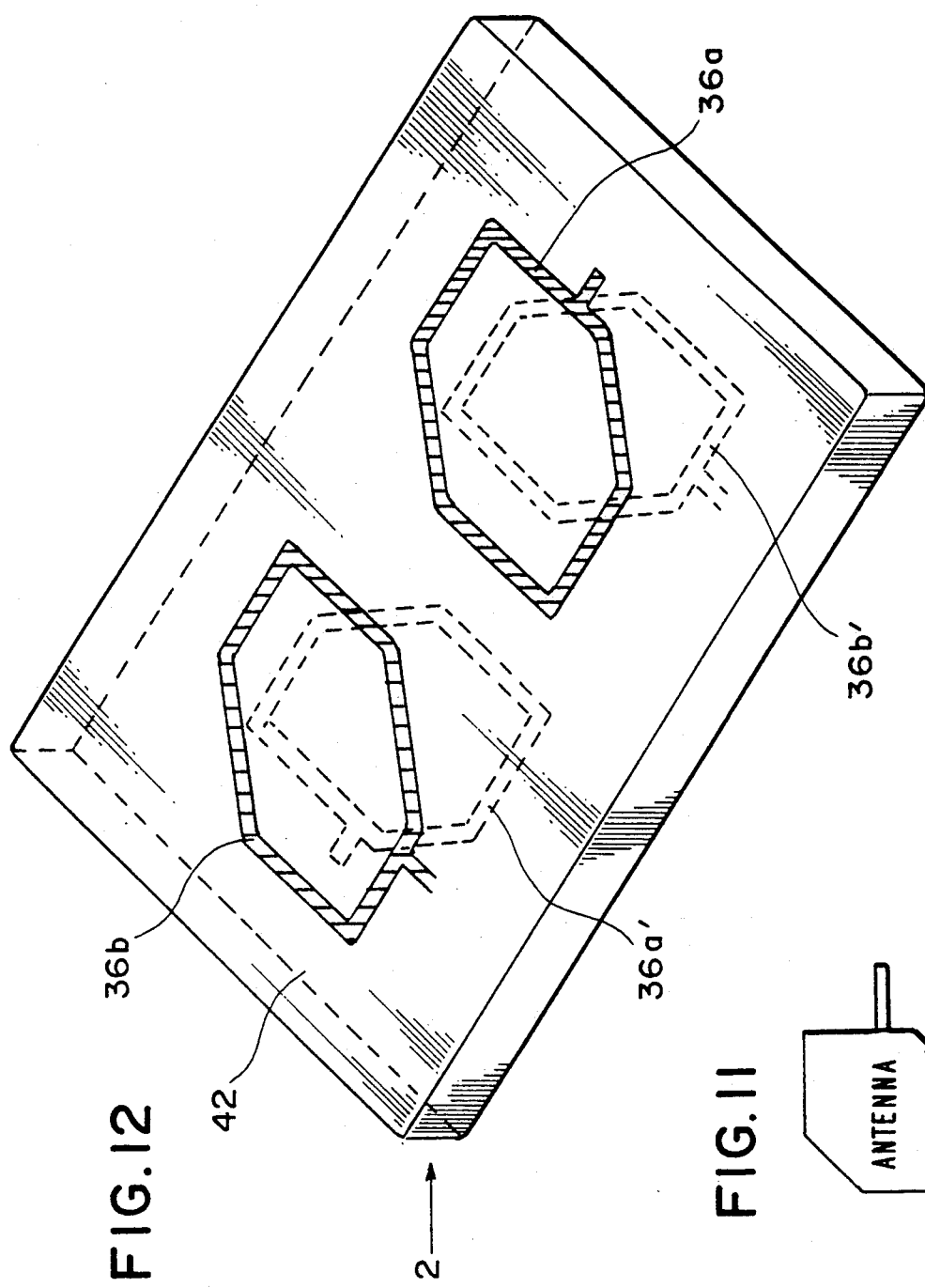

FIG. 12 shows a variant embodiment of a responder unit in which the antennas of FIG. 11 are disposed on each of the faces of the response badge, thus allowing the latter to be used for reception and emission by its two faces.

Figure 13:
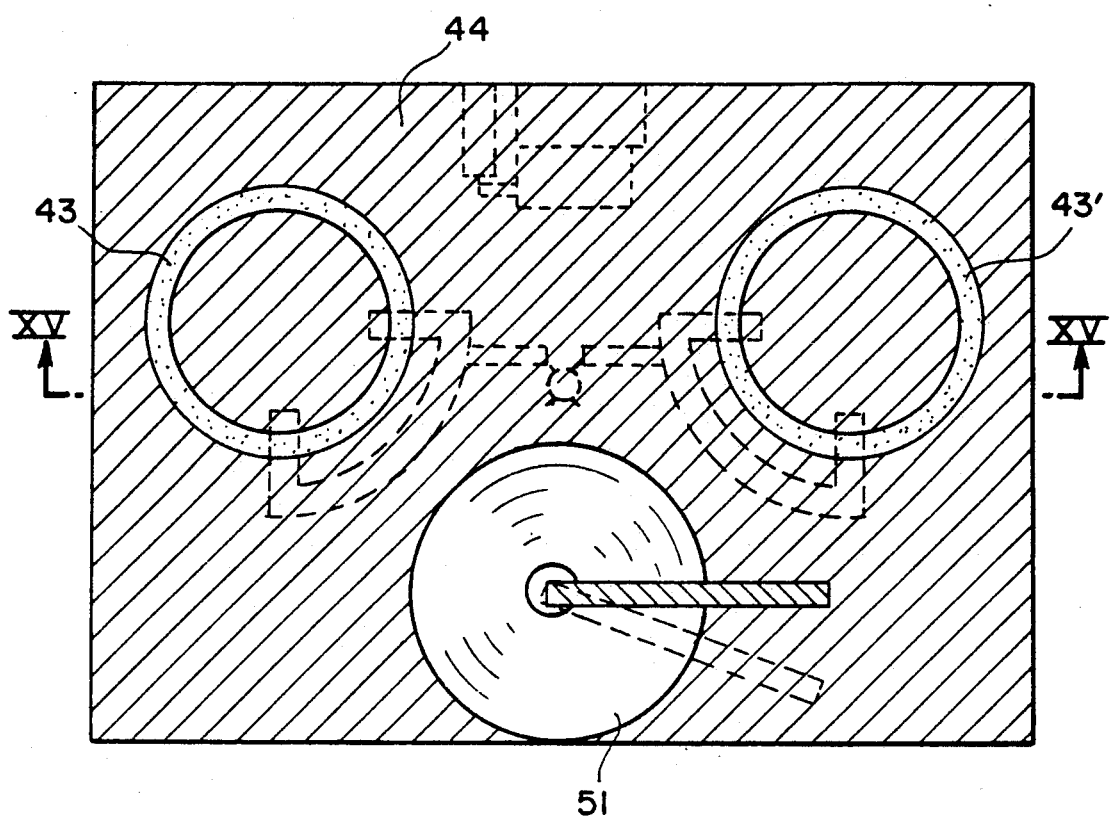

FIG. 13 shows a view of a variant embodiment of a responder unit equipped with two twinned circular slot antennas.

Figure 14:
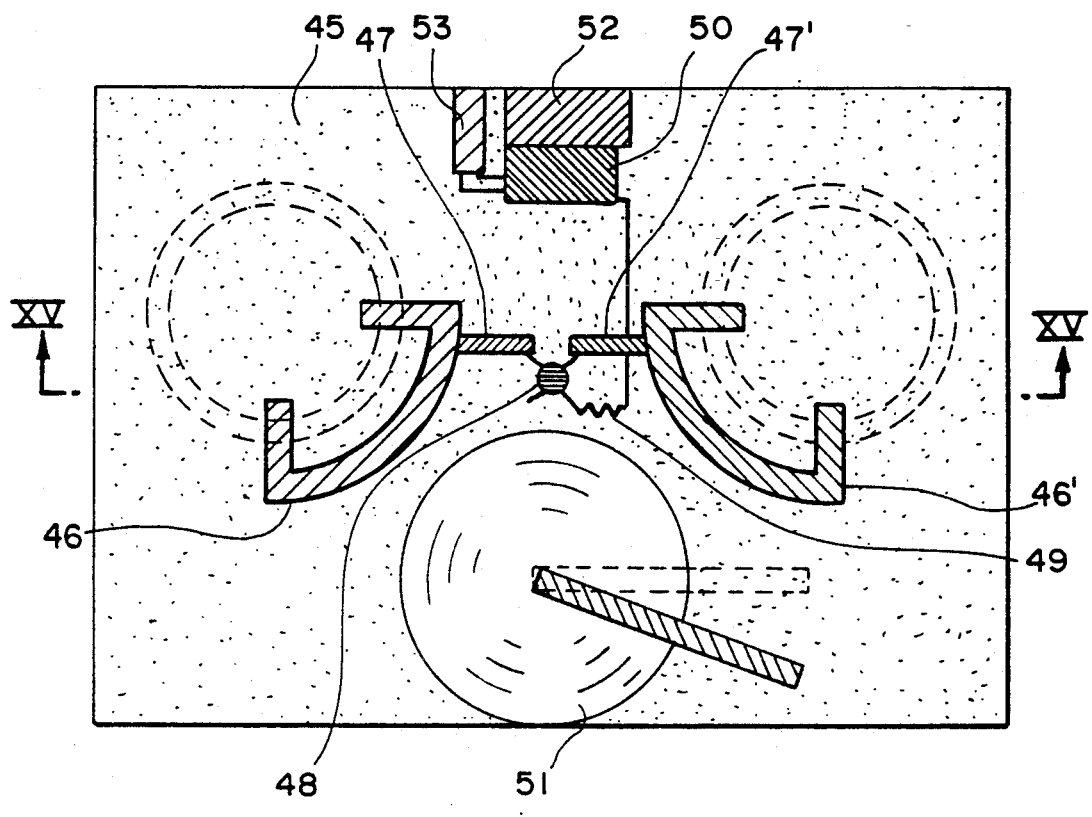

FIG. 14 shows the responder unit of FIG. 13 by its opposite face.

Figure 15:
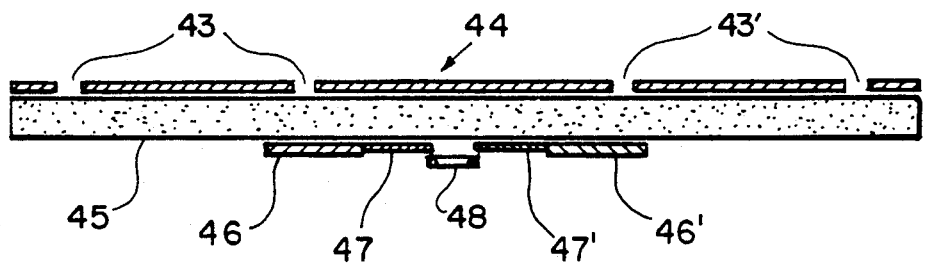

FIG. 15 shows a view in section of the badge of FIGS. 13 and 14 along lines XV—XV respectively of FIGS. 13 and 14.

Figure 16:
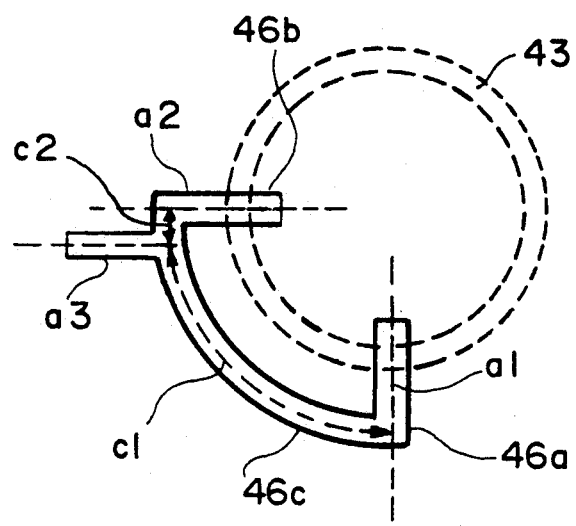

FIG. 16 illustrates the embodiment of a microstrip supplying a slot antenna with circular polarization for the badge of FIGS. 13, 14 and 15.

Figure 17:
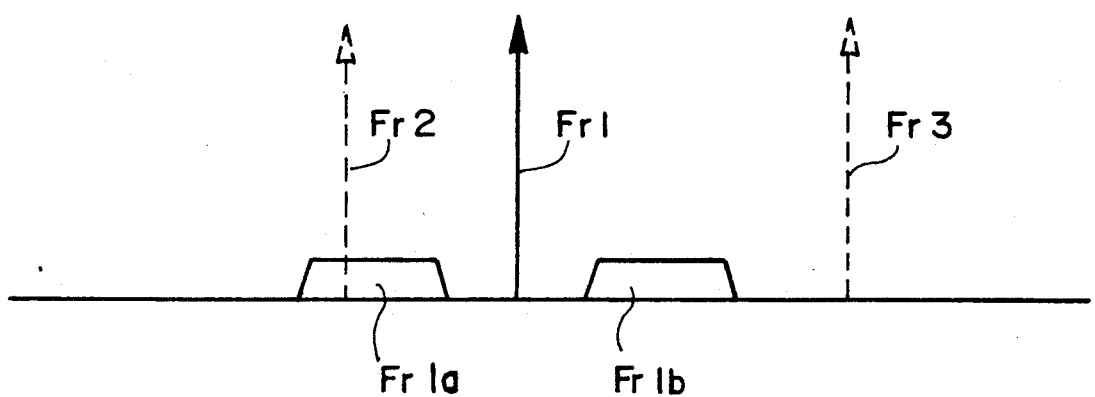

FIG. 17 shows a diagram illustrating the offset of the frequencies between two adjacent interrogators in order to avoid interferences.

Figure 18:
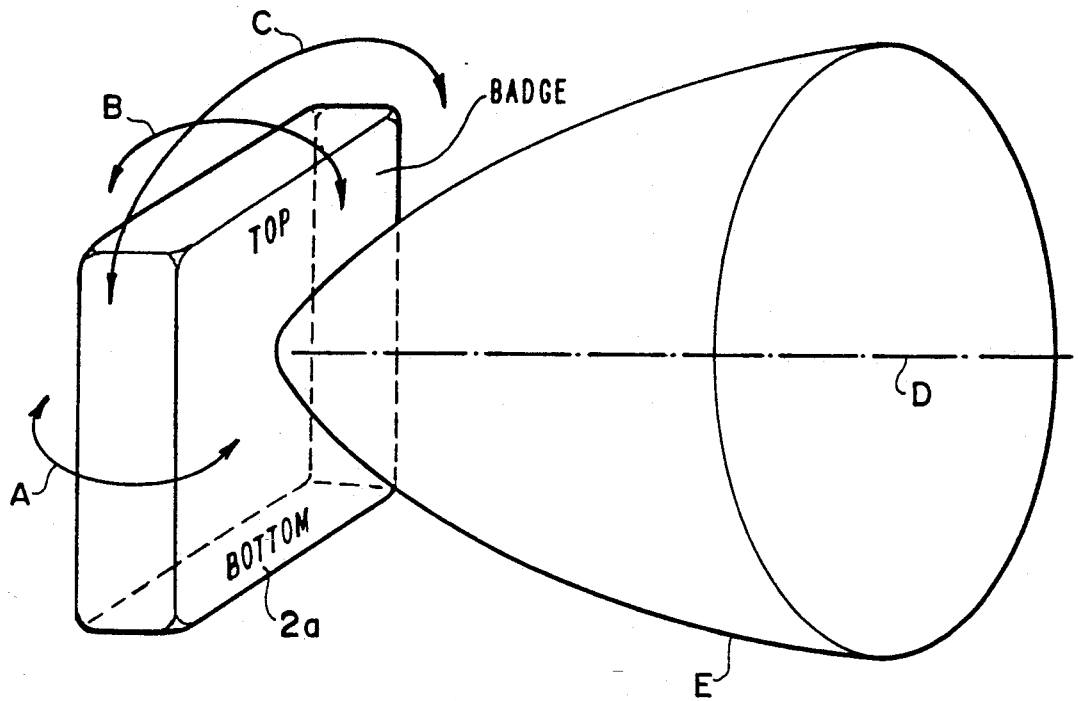
Figure 19:
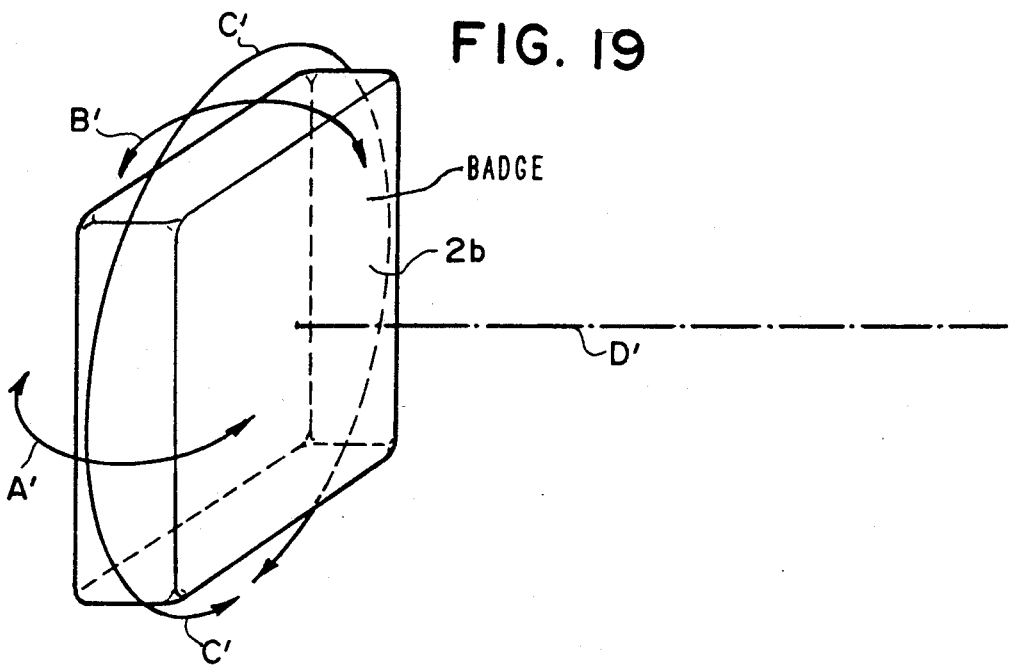

FIG. 18 and FIG. 19 illustrate the possibilities of the angular positioning of the responder unit, respectively according to the prior art (FIG. 18), and within the framework of the present invention (FIG. 19).

FIG. 20 shows a timing diagram which illustrates the receptions of response signals from a plurality of badges.

DETAILED DESCRIPTION OF THE INVENTION

The device of the invention which will be described hereinafter lies within the framework of the systems of identification by question and responses, as defined hereinbefore and in connection with the general diagrams of FIGS. 1 and 2.

According to a first characteristic of the invention, the inquiry wave 5 is emitted from an antenna 3a (FIG. 2a and FIG. 4) which is provided with a topology adapted to generate the emission of a wave in vertical polarization. This wave is, for example emitted on a frequency of 2.45 GHz and it is constituted by a non-modulated maintained wave.

This inquiry wave will be received at the level of the responder unit by the antenna 6a with circular polarization in a first direction of the rotation of polarization.

FIG. 2a shows slot antennas with circular polarization as shown in greater detail, particularly in FIG. 13.

The advantage of a reception in circular polarization is that of allowing a reception of the signal, i.e. of the inquiry wave 5, by the responder unit in a much broader range of angular positions, which is illustrated in FIGS. 18 and 19.

FIG. 18 shows a responder badge 2a according to the presently known techniques and which is positioned orthogonally with respect to the ideal straight line D which joins the responder badge to the interrogator; in this position, the badge is in the position of maximum receptivity; and it is seen that, around this ideal position clearances are allowed along three beat axes corresponding to segments A, B and C; in the presently known techniques, the angle of aperture around the ideal position does not exceed substantially 22°, i.e. each of segments A, B, C, illustrating the extreme possibilities of the positioning of the badge, do not exceed 45°.

FIG. 19 shows the badge according to the invention which comprises a reception antenna with circular polarization.

It is seen that, if segments A' and B' are equivalent to segments A and B of the preceding badge, the badge according to the invention may be positioned in its plane according to any angular value, segment C', defines the geometric locus of the active positions of the badge 2b in its plane, attaining 360°.

In fact, it will be understood that, whatever the position of the responder badge 2b, the antenna 6a of circular polarization (FIG. 2a) will always be in a position to pick up a wave of plane polarization (whatever the positioning of the responder unit in this plane).

According to this first characteristic of the invention, the responder unit is thus adapted, as is seen in FIG. 19, to be positioned in its plane in an indifferentiated manner while remaining in a position of receptivity of the inquiry signal.

In parallel, it is always seen in FIG. 2a that the reception antenna 6a is associated with the symmetrical antenna 6b which is of the slot type and with circular polarization is inverted with respect to the direction of the rotation of the polarization of the reception antenna 6a.

This re-emission antenna 6b returns the response signal (after modulation as set forth in greater detail hereinbelow); the response wave is of circular polarization, and of a direction opposite the polarization of the receiver antenna 6a.

In this way, by inverting the directions of rotation of the polarization, an interference between the receiver antenna 6a and the emitter antenna 6b is avoided; due to the inversion of the direction of the polarization, the antenna 6a is not in a position to receive the response signal 11.

The interrogator itself receives the response signal 11 (with circular polarization) by the antenna 3b of the plane polarization type; the plane of polarization of the antenna 3b is offset by 90° with respect to the plane of polarization of the emitter antenna 3a.

Interferences are also avoided, at the level of the interrogator, between the emission signals emitted by antenna 3a which cannot be received by antenna 3b due to the offset of the planes of polarization.

However, antenna 3b with plane polarization is in a position to receive in the circular polarization wave 11, the horizontal component. Under these conditions, both at the level of the interrogator and at the level of the responder unit, a decoupling is obtained between the two antennas respectively of opposite polarizations and non-compatible, with the result that the reception antenna, at the level of each of the elements, cannot receive parasitically the signal emitted by the adjacent antenna.

Furthermore, at the level of the response wave 11, the advantages of the circular polarization which were indicated at the level of reception by antenna 6a are found again; due to the circular polarization, the response wave 11 will be received by the antenna 3b whatever the positioning in its plane of the responder unit and therefore of the re-emission antenna 6b; in fact, whatever this position, the circular polarization will automatically generate a component coming in concordance with the plane of polarization of the receiving antenna 3b.

It is therefore seen that, due to this first characteristic of the invention, the possibilities for of use the responder units are considerably broadened. Since the responder unit is positioned in a plane substantially orthogonal with respect to the straight line joining it to the interrogator (with tolerances of 45° in elevation and in azimuth), the responder unit may in this position be rotated equally well in its plane through 360° without modifying the quality of reception and re-emission.

FIGS. 3 to 8 illustrate variant embodiments of the invention which show, in particular, configurations of antennas disposed in a network so as to orient the radiation lobe in a preferential zone in space.

FIG. 2a shows a single emission antenna.

However, it may be advantageous to replace this single antenna by a network of antennas in order to set up certain zones in space which correspond to preferential monitoring zones.

Figure 3:
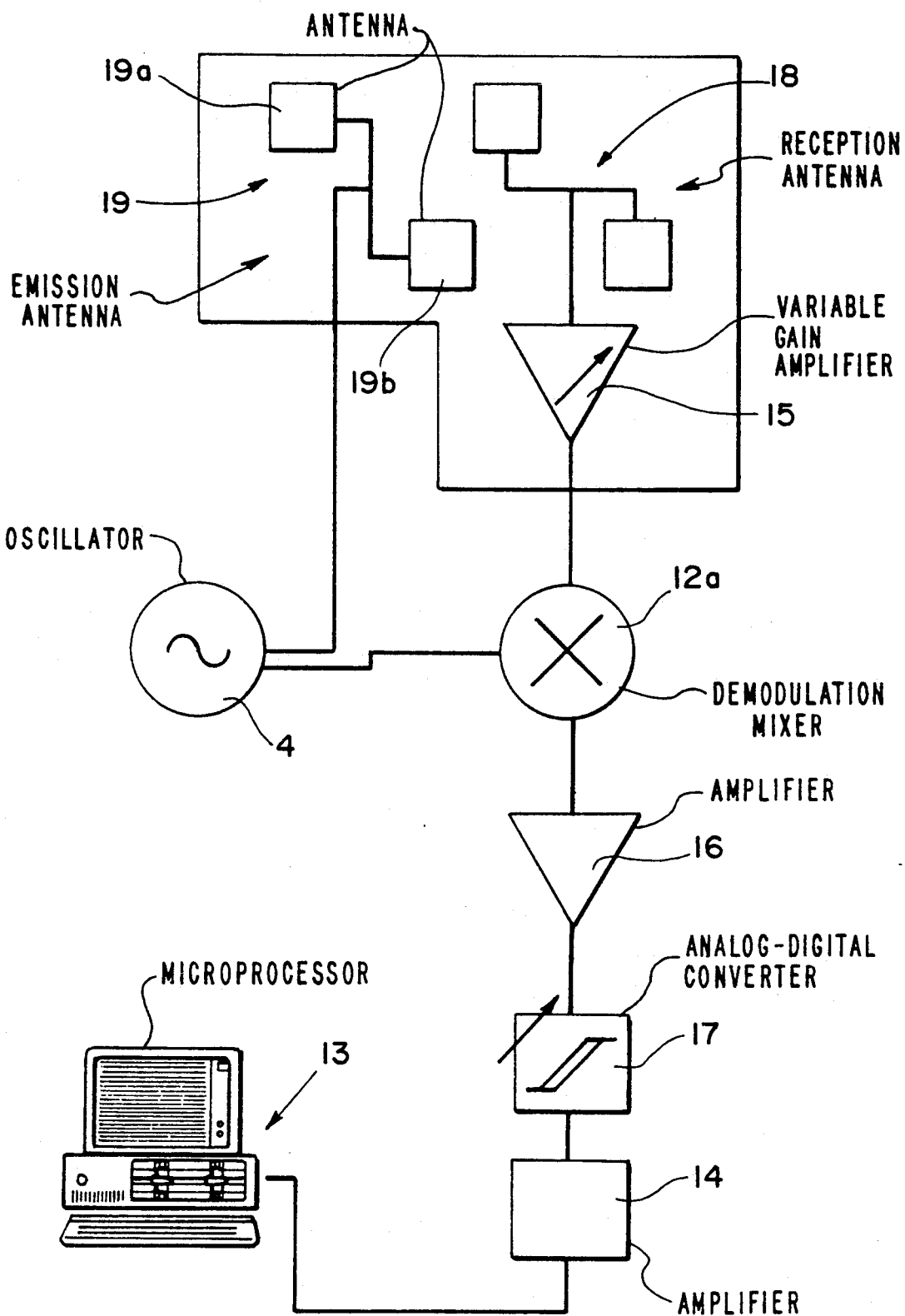
FIG. 3 shows a diagram of the production of an interrogation station or interrogator according to the invention.

FIG. 3 shows by way of example a first form of a network with two antennas, one for emission and one for reception.

Figure 1:
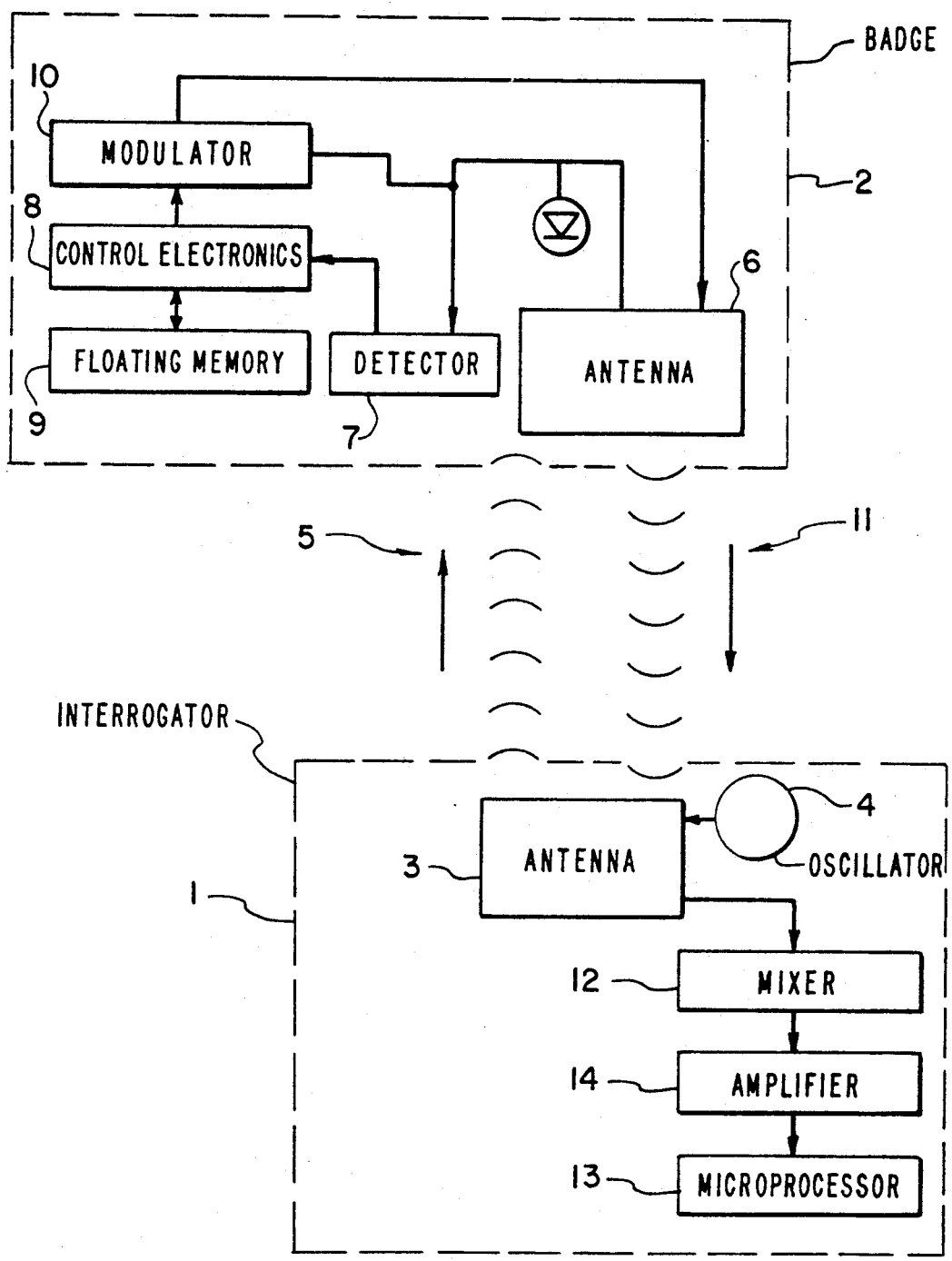
FIG. 1 shows a general skeleton diagram of an interrogation and response system used within the framework of the invention.
Figure 2:
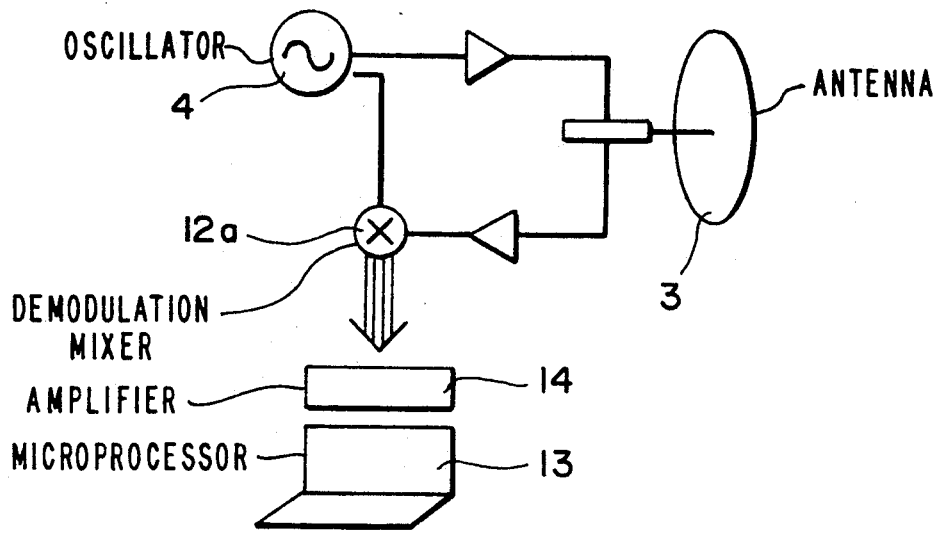
FIG. 2 is a schematic representation of the interrogation and response system of FIG. 2.

FIG. 3 generally shows the interrogation station 20 comprising the same means as shown in FIGS. 1 and 2 (and allocated by the same references).

The interrogation station of FIG. 3 is shown in addition with a variable gain amplifier 15, interposed between the demodulation mixer 12a and the reception antenna 18, described hereinafter; downstream of the demodulation mixer 12a is also shown an amplifier 16 and an analog-digital converter 17.

FIG. 3 shows a configuration of antennas specific both at the level of the emission antenna 19 and at the level of the reception antenna 18.

The two antennas 19a and 19b are conjugate and disposed in this example to generate an oblique radiation lobe, which corresponds to an identical adjacent reception lobe at the level of antenna 18.

FIG. 5 shows a variant embodiment of a network 20 of two antennas 20a, 20b, twinned and disposed side by side.

These twinned antennas will allow the emission of a radiation lobe to be widely spread on either side of the plane of the antenna so as to cover preferentially the zones located on each side.

This arrangement widens the radiation lobe in a horizontal plane while maintaining it as substantially confined in a vertical plane.

A radiation lobe 21 shown in FIG. 6 is attained, spread out laterally on either side of the axis 20x joining the two elementary antennas 20a and 20b while avoiding a loss of height.

This configuration may be advantageous when it is desired to watch or monitor a zone located around a level which is mean in height but capable of being widely spread to the right and left of the level of the antenna.

FIG. 7 shows a new example which illustrates a network 22 of four antennas 22a, 22b, 22c and 22d connected to a common supply.

It will be understood that the interrogation may be effected in vertical polarization and in horizontal polarization (what is important is that the emission antennas on the one hand, and reception antennas on the other hand, adopt polarization planes offset by 90°).

In the example of FIG. 3, the emission antenna 19a and 19b are in horizontal polarization while the antennas of FIGS. 5, 7 and 8 function in vertical polarization.

In all of these examples, the side of antenna L is determine by the formula $L = lg/2 - 2dlo$ in which dlo is a coefficient which corresponds to taking into account the edge effect and lg is the guided wave length of the working signal.

FIG. 8 illustrates a new development of the invention in which the twinned antennas 20d and 20c respectively are of the type shown in FIG. 5, but their network comprises micro-strips for connection, connected upstream to the supply 25 via a commutator 26, and connected to the supply common, the two antennas 20c and 20d, at different levels.

Consequently, action on the commutator 26 makes it possible to supply the pair of antennas 20c and 20d either by channel 23 or by channel 24.

The preferential supply thus oriented towards one antenna to the detriment of the other generates the emission of a radiation lobe 27 (corresponding to a preferential supply of antenna 20c), thus allowing the monitoring of a zone in space according to an emission lobe 27 of which the axis 28 forms an angle with the plane of the two antennas 20c and 20d.

The commutation of the supply on channel 24 makes it possible immediately afterwards to orient the emission lobe 27' along axis 28' symmetrical to axis 28.

From the same network of antennas 20c and 20d, the right-hand part and then the left-hand part of the zone of surveillance may thus be alternately monitored.

FIGS. 9, 10, 11, 12, 13, 14, 15 and 16 illustrate the embodiment of the invention at the level of the responder unit.

The responder unit which is within the framework of an important development of the invention comprises an original characteristic which allows for the discrimination of the response signals which are capable of being emitted by two, or more, responder units simultaneously present in a monitoring zone served by the inquiry signal, consequently provoking in principle the emission at the level of the two responder units, of response signals which are simultaneous, therefore unintelligible for the interrogator.

Within the framework of the embodiment of the invention, the responder unit comprises a random delay generator which is provided in order to determine, between several re-emissions of successive response signals, using an offset in time, with the result that each response signal is in time strictly independent of the inquiry signal and likewise independent of the preceding re-emission signal.

This important characteristic is illustrated in particular in FIG. 20.

This Figure shows a timing diagram which shows the positioning in time, from moment T 0 corresponding to any reference time, of the re-emissions (echoing) or response signals coming from four responder units A, B, C and D respectively, presenting themselves substantially at the same time within the monitoring zone served by the radiation lobe. In FIG. 20 and to render the drawings clearer, the proportions between the emission times and the intervals of silence are not respected.

As we have seen, theoretically the responder units, receiving substantially at the same time the inquiry wave, echoed substantially at the same time a response signal; the response signals were superposed on the same frequency, and consequently were inaudible for the interrogator.

It is seen in FIG. 20 that each response signal A1, B1, C1, etc. is constituted by a burst 29 of elementary pulses 29a, 29b which correspond to a codification specific to the responder units.

In the present case, codification by modulation of the response signal is effected by the modulation of pulses.

As will be set forth in greater detail hereinbelow, the inquiry wave is a maintained, continuous wave, non-modulated, which is consequently received permanently by the interrogator during the whole period during which it lies within the radiation lobe.

This wave is re-emitted by modulated segments at irregular intervals which correspond to the response emissions A1, A2, A3, etc. . . . for badge A, B1, B2, B3 for badge B, etc. . . .

According to an important characteristic of the invention, each responder badge comprises in its logic circuit a random delay generator such that the re-emissions of response signals are located in time in an erratic manner and without temporal links either with the reception of the inquiry wave or with the emission of the preceding response signal.

In the light of FIG. 20 in particular, it is therefore seen that, consequently the response signals are distributed at random times, offsets are automatically obtained due to the application of the law of large numbers, which makes it possible to discriminate the response signals emitted by one responder unit with respect to another.

On the response diagrams of FIG. 20, it is seen in particular that the responder unit D first emits separately a signal D1 which is received by the interrogator, thus allowing identification of the responder unit D.

Immediately afterwards, the responder units B and C emit while substantially overlapping each other in time, with the result that the two signals D1 and C2 interfere with each other and will not be recognized by the interrogator; the same also applies to signal A1 which lies substantially in a position of interference with the signal D2 and the signal C2, with the result that none of these three signals can be separated from the whole.

Signal B2 then intervenes which is clearly detached from the other signals and which therefore allows identification of responder unit B.

The same applies to responder unit C which may be identified at the level of its response signal C3 which is perfectly offset with respect to the others.

Signal D3 is also isolated and would allow a fresh identification of the responder unit D (which was already recognized at the level of response D1).

It is seen in this example that the responder unit A has still not been identified; responses A2 and A3 which are interfering with other signals will not allow its separate identification.

It is at the level of the response signal A4, then possibly A5 or even A6 that the badge A may be identified in turn.

It will be understood that, under these conditions, although four responder units are simultaneously in a position of response in the radiation lobe, the interrogator will, however, be in a position, thanks to the random offsets of the response signals, to receive the necessary information for identifying all the responder units.

The value of the random delay is determined at the level of the delay generator and this delay is in fact a pseudo-random delay which is limited between a minimum value and a maximum value.

The minimum value is a function of the duration of the emission of the response signal and it depends on the maximum number of badges capable of being identified simultaneously; this minimum value thus is a multiple (depending on the number of badges capable of being received simultaneously) of the average duration of the burst of pulses corresponding to a signal.

The maximum value is determined for a given range of the interrogator by the maximum dwell time of the responder unit within the radiation lobe corresponding to the monitoring zone.

The embodiment of the responder unit is illustrated in FIGS. 9, 10, 11, 12, 13, 14, 15 and 16.

FIG. 9 gives a first embodiment in which the signal received by antenna 36 after having alerted the detector 37 is received by the commutator 38a subject to re-emission thereof after a random delay time as described previously; the re-emission is effected after modulation of the pulses under the control of the control electronics 38 connected to memory 39.

It is seen that, in that case, the modulated signal is retransmitted in a direction of polarization 40 orthogonal to the direction of polarization 41 corresponding to reception.

The circular polarization, advantageously carried out, may be obtained at the level of the responder unit by configurations of the antennas as illustrated in FIGS. 10, 11 and 12.

Antennas 36a and 36b are provided with topologies which allows receptions and emissions in circular polarization in two directions of the rotation of the polarization inverted on one antenna with respect to the other; this was described previously.

FIG. 12 shows an example of the assembly of the two antennas of FIGS. 10 and 11 on a responder badge.

One antenna is allocated to emission while the other antenna is allocated to reception.

According to an original characteristic of the invention, the responder badge of FIG. 12 is provided with a possibility of receptivity on its two faces and comprises to that end an antenna 36a and an antenna 36b on a first face 42 while, on the opposite face, there appear the two antennas 36a' and 36b' disposed in a configuration identical to the antennas 36a and 36b on face 42 and separated by a common block plan.

According to the example of FIG. 12, a responder unit is thus produced which is capable of receiving the inquiry wave and of returning (echoing) it with the response signal; whatever its positioning with respect to the interrogator, the two faces of the responder unit, front and rear respectively, are likewise operational.

FIGS. 13, 14, 15 and 16 illustrate more specifically an embodiment of a responder presenting, as set forth above two twinned antennas with circular polarization and with their direction of rotation inverted with respect to each other, thus making it possible to carry out, simply and efficiently, the means of the invention.

In this embodiment, antennas with circular polarization of the slot type have been used.

These antennas have the known property of allowing a reception by one face or by the other, and they are constituted by a circular gap or slot 43, 43' disposed on the metal plate 44, itself resting on a dielectric 45.

The antennas constituted by the slots 43, 43' are supplied by a micro-strip 46, 46' of specific form and shown in greater detail in FIG. 16.

It is seen that this microstrip comprises two arms 46a and 46b disposed radially with respect to the circular slot 43, and these two radial arms are joined by segment 46c.

This microstrip 46 is itself supplied from connection 47.

In known manner, this type of supply by micro-strip along the two radial arms 46b and 46a, determines the emission to be in circular polarization and the diameter of the slot determines the frequency of the emission.

Considering the median axis a1 of the radial arm 46a, the median axis a2 of the radial arm 46b, the median axis of the connection a3, and, finally, the median curved line C1 of the segment 46c, it is determined that the difference between distances C1 and C2 is defined as being the quarter of the emission wave length.

The two micro-strips 46 and 46' are positioned symmetrically, consequently they determine at the level of the slot antennas 43, 43', waves with circular polarization of direction of rotation inverted from one antenna with respect to the other, as described previously.

The supply connections 47 and 47' are in turn bridged by the transistor 48, supplied with the interposition of the resistor 49 by the integrated circuit 50.

This latter is preferably of the type with permanent supply at low voltage from the battery 51.

The integrated circuit 50 may be joined by a connection 52 to the outside for programmation of the memorized code, and it is associated with a quartz clock 53.

The integrated circuit comprises a random delay generator which makes it possible to supply at irregular intervals, as set forth previously, the modulation transistor 48.

Under these conditions, it will be understood that the transistor 48 is supplied permanently but at irregular intervals. As long as the responder unit of FIGS. 13, 14 and 15 lies outside a zone of radiation, the transistor "modulates off-load".

As soon as the responder unit penetrates in a radiation lobe, the slot antenna 43 receives the inquiry signal on a determined frequency (on which the antenna is precisely set).

The reception antenna 43 is then placed, or not, in communication with the re-emission antenna 43', depending on whether the re-emission micro-strip 46' is or is not in communication with the reception micro-strip 46 by the supply of the modulation transistor 48.

In the intervals separating the successive emissions of a response signal (in the form of a burst of pulses), the re-emission antenna 43 is isolated from the reception antenna with the result that the inquiry signal received by the antenna 43 cannot be conveyed towards re-emission antenna 43' and this antenna remains silent.

During the activation period of the transistor 48 under the control of the integrated circuit 50, the communication between the two connections 47 and 47', therefore between the two micro-strips 46 and 46', is effected and the signal received by antenna 43 may be conveyed towards antenna 43', receiving, on passage, the pulse modulation determined by the transistor 48.

And as described previously, re-emission is effected on waves with circular polarization with their direction of rotation inverted with respect to the direction of rotation of the polarization of the reception antenna 43 which can therefore not be troubled or disturbed by a parasitic reception of the emission of its adjacent antenna.

A last development of the invention is illustrated in FIG. 17.

According to this development, each interrogator may have its frequency regulated and adjusted within the reception band of the antennas of the interrogators in service.

According to FIG. 17, it is seen that the signal Fr1 corresponds to the setting of an interrogation frequency first given to an interrogator.

This inquiry signal will accompanied, at the level of the response, by the modulation signals illustrated by lateral bands Fr1a and Fr1b.

It is seen that, by reason possibly of constructional tolerances, an adjacent interrogator set in principle on a frequency Fr1 identical to the first, might accidentally be offset on an adjacent frequency, for example frequency Fr2.

This frequency Fr2 is located precisely within the lateral band Fr1a.

Consequently, the interrogator receives its response signal Fr1 and its lateral bands Fr1a and Fr1b, but will receive at the same time the parasitic signal constituted by the interrogation emission Fr2 of the adjacent interrogator.

In order to avoid this phenomenon, set the frequencies of the inquiry signals within the exploitation band; the frequencies of the interrogators capable of are used near one another being offset on the frequency spectrum of a length greater than the width of the lateral bands Fr1a and Fr1b.

In this way are avoided the risks of interference between the reception of an interrogator receiving both its own echo from a responder unit and at the same time the inquiry signal from the adjacent interrogator.

From a certain spacing distance such as Fr1 and Fr3, it is easy, by a set of filters, to eliminate the parasitic signals.

We claim:

1. An identification device of the type comprising, on the one hand, an interrogator constituted by a radio ultra high frequency wave transceiver, the said interrogator comprising an interrogator emission antenna for emission of a permanent inquiry wave and an interrogator reception antenna, and, on the other hand, a responder, said responder comprising a responder reception antenna for reception of said inquiry wave, a modulation transistor for coded modulation of said wave and a responder remission antenna for re-emission of said modulated wave as a respond signal back to the interrogator, characterized in that the interrogator emission antenna is of a topology of plane polarization type in a first plane of polarization, and the interrogator reception antenna is of a topology of plane polarization type in a second plane of polarization orthogonal with respect to the said first plane, and in that the responder reception antenna is of a topology of circular polarization type with a first direction of rotation of the polarization and the responder re-emission antenna is of circular polarization type with a second direction of the polarization opposite the first one.

2. The device of claim 1, characterized in that the responder further comprises connection means for communication between the responder reception antenna and the responder re-emission antenna through said modulation transistor, and in that it further comprises a programmable integrated circuit to control supply of the transistor with pulse modulation, and the said integrated circuit comprises a random delay generator to supply said transistor at irregular intervals so as to locate in time the re-emission of the modulated response signal in erratic manner, to discriminate the response signals from one responder with respect to another.

3. The device of claim 1, characterized in that the responder is constituted by a badge of substantially flat shape and the said responder reception antenna and said responder re-emission antenna are of the slot type with microstrip and being positioned side by side symmetrically on the same plane.

* * * * *